US012701211B2

(12) United States Patent
Dudrenov et al.

(10) Patent No.: US 12,701,211 B2
(45) Date of Patent: Aug. 4, 2026

(54) REDUCING POWER CONSUMPTION OF A LENTICULAR DISPLAY

(71) Applicant: Apple Inc., Cupertino, CA (US)

(72) Inventors: Pavel V. Dudrenov, San Francisco, CA (US); Edwin Iskandar, San Jose, CA (US); Zachary D. Corley, Westminster, CO (US)

(73) Assignee: Apple Inc., Cupertino, CA (US)

( * ) Notice: Subject to any disclaimer, the term of this patent is extended or adjusted under 35 U.S.C. 154(b) by 231 days.

(21) Appl. No.: 18/374,120

(22) Filed: Sep. 28, 2023

(65) Prior Publication Data

US 2024/0236292 A1 Jul. 11, 2024

Related U.S. Application Data

(60) Provisional application No. 63/437,454, filed on Jan. 6, 2023.

(51) Int. Cl.
| | |
|---|---|
| *H04N 13/368* | (2018.01) |
| *G06T 7/70* | (2017.01) |
| *H04N 13/305* | (2018.01) |
| *H04N 13/398* | (2018.01) |
| *H04N 17/00* | (2006.01) |

(52) U.S. Cl.
CPC ............. *H04N 13/368* (2018.05); *G06T 7/70* (2017.01); *H04N 13/305* (2018.05); *H04N*

*13/398* (2018.05); *H04N 17/004* (2013.01); *G06T 2207/30196* (2013.01)

(58) Field of Classification Search
CPC .......... G06F 3/011; G06F 3/017; G06F 1/163; G06F 3/04815; G06F 3/0346; G02B 27/017; G02B 2027/014; G02B 2027/0138; G02B 2027/0187; G06V 20/20; G09G 2354/00
See application file for complete search history.

(56) References Cited

U.S. PATENT DOCUMENTS

2020/0209609 A1 * 7/2020 Clarke ..................... G09G 5/14

* cited by examiner

*Primary Examiner* — Farhan Mahmud
(74) *Attorney, Agent, or Firm* — Fernando & Partners, LLP

(57) ABSTRACT

In one implementation, a method of operating a wearable device is performed by a device in a physical environment, the device including a processor, non-transitory memory, and a display. The method includes determining a device operating condition based on whether the device is being worn by a user. The method includes, in response to determining that the device operating condition is a first operating condition corresponding to the device being worn by the user, selectively activating a portion of the display based on a location of a person in the physical environment to display content to the person. The method includes, in response to determining that the device operating condition is a second operating condition corresponding to the device being unworn by the user, activating at least a portion of the display based on a content type of content to display the content.

20 Claims, 9 Drawing Sheets

600

At a device in a physical environment, the device including one or more processors, non-transitory memory, and a display:

Determining a device operating condition based on whether the device is being worn by a user ⟶610

In response to determining that the device operating condition is a first operating condition corresponding to the device being worn by the user, selectively activating a portion of the display based on a location of a person in the physical environment to display content to the person ⟶620

In response to determining that the device operating condition is a second operating condition corresponding to the device being unworn by the user, activating at least a portion of the display based on a content type of content to display the content ⟶630

100
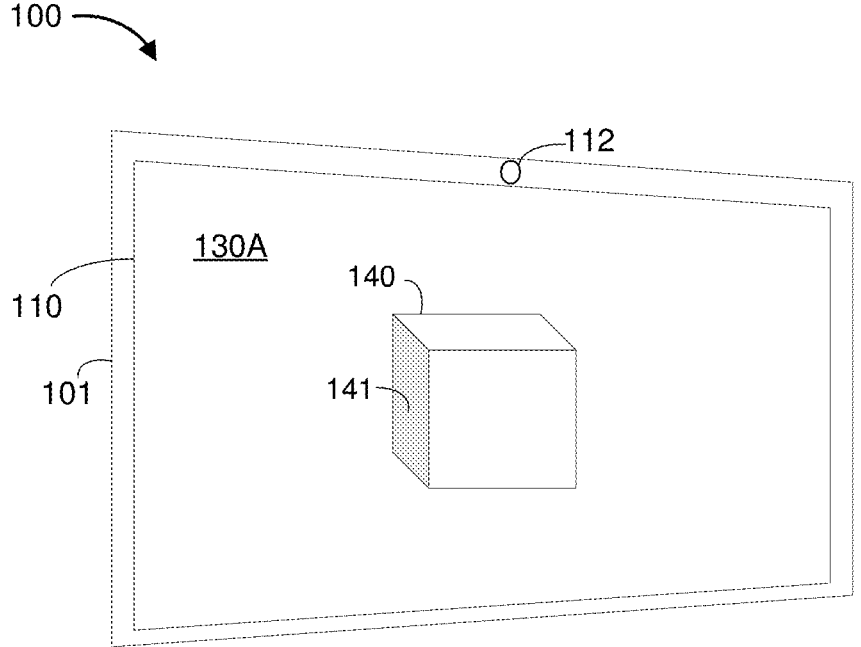
112
130A
110
101
140
141
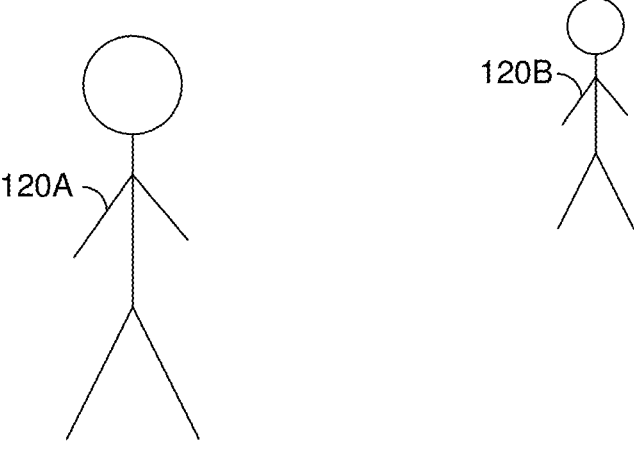
120A
120B
Figure 1A

<u>500</u>

At a device including one or more processors, non-transitory memory, an image sensor, and a lenticular display:

Capturing, using the image sensor, an image of a physical environment

⌐510

In response to detecting, in the image of the physical environment, one or more users at one or more horizontal angles with respect to the lenticular display, selectively activating a portion of the lenticular display to display content at the one or more horizontal angles

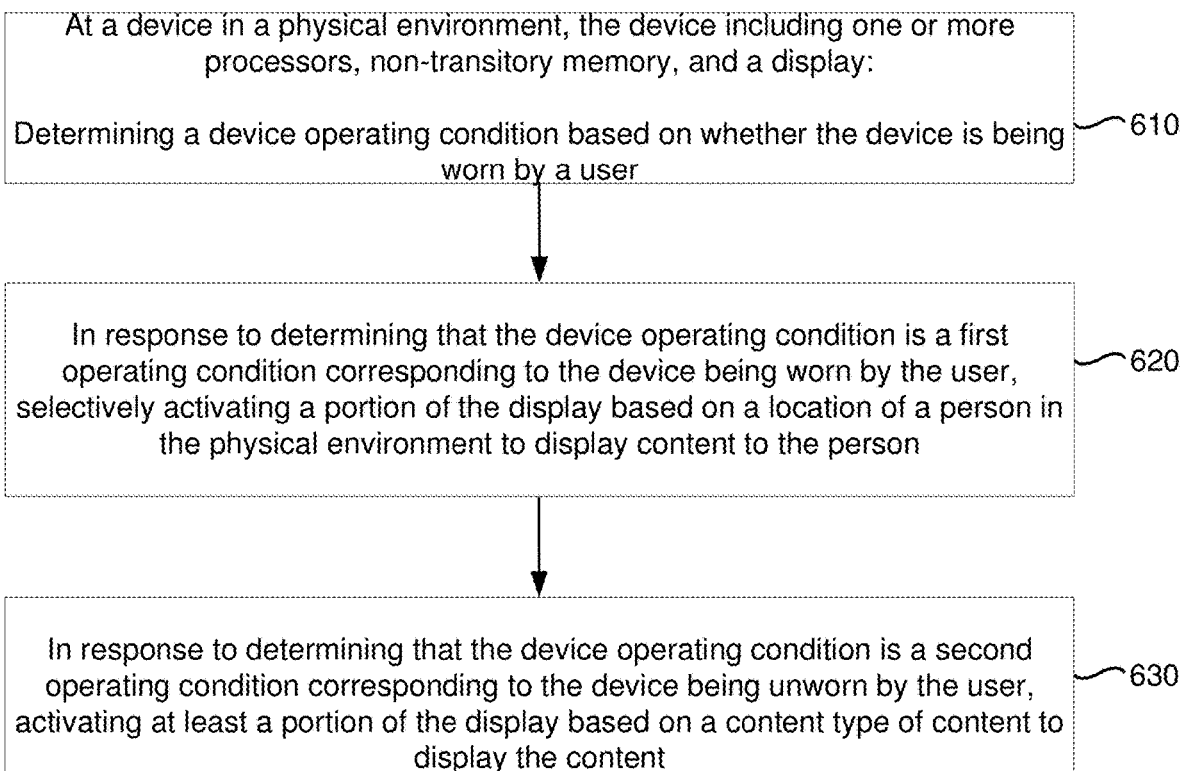

600

At a device in a physical environment, the device including one or more processors, non-transitory memory, and a display:

Determining a device operating condition based on whether the device is being worn by a user —610

In response to determining that the device operating condition is a first operating condition corresponding to the device being worn by the user, selectively activating a portion of the display based on a location of a person in the physical environment to display content to the person —620

In response to determining that the device operating condition is a second operating condition corresponding to the device being unworn by the user, activating at least a portion of the display based on a content type of content to display the content —630

Figure 6

REDUCING POWER CONSUMPTION OF A LENTICULAR DISPLAY

CROSS-REFERENCE TO RELATED APPLICATIONS

This application claims priority to U.S. Provisional Patent App. No. 63/437,454, filed on Jan. 6, 2023, which is hereby incorporated by reference in its entirety.

TECHNICAL FIELD

The present disclosure generally relates to lenticular displays and, in particular, to systems, methods, and devices for reducing power consumption on devices with lenticular displays.

BACKGROUND

Lenticular displays are capable of displaying different content at different angles. For example, when viewing a lenticular display from a first horizontal angle, an image from a first perspective is seen and when viewing the lenticular display from a second horizontal angle, the image from a second perspective, different than the first perspective, is seen.

However, rendering the image from multiple perspectives and displaying the image at the multiple perspectives can consume significant amounts of power, particularly when the number of perspectives is large.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1A illustrates a first perspective view of an example operating environment.

FIG. 5 is a flowchart representation of a method of operating a lenticular display in accordance with some implementations.

FIG. 6 is a flowchart representation of a method of operating a wearable device in accordance with some implementations.

Figure 1B:
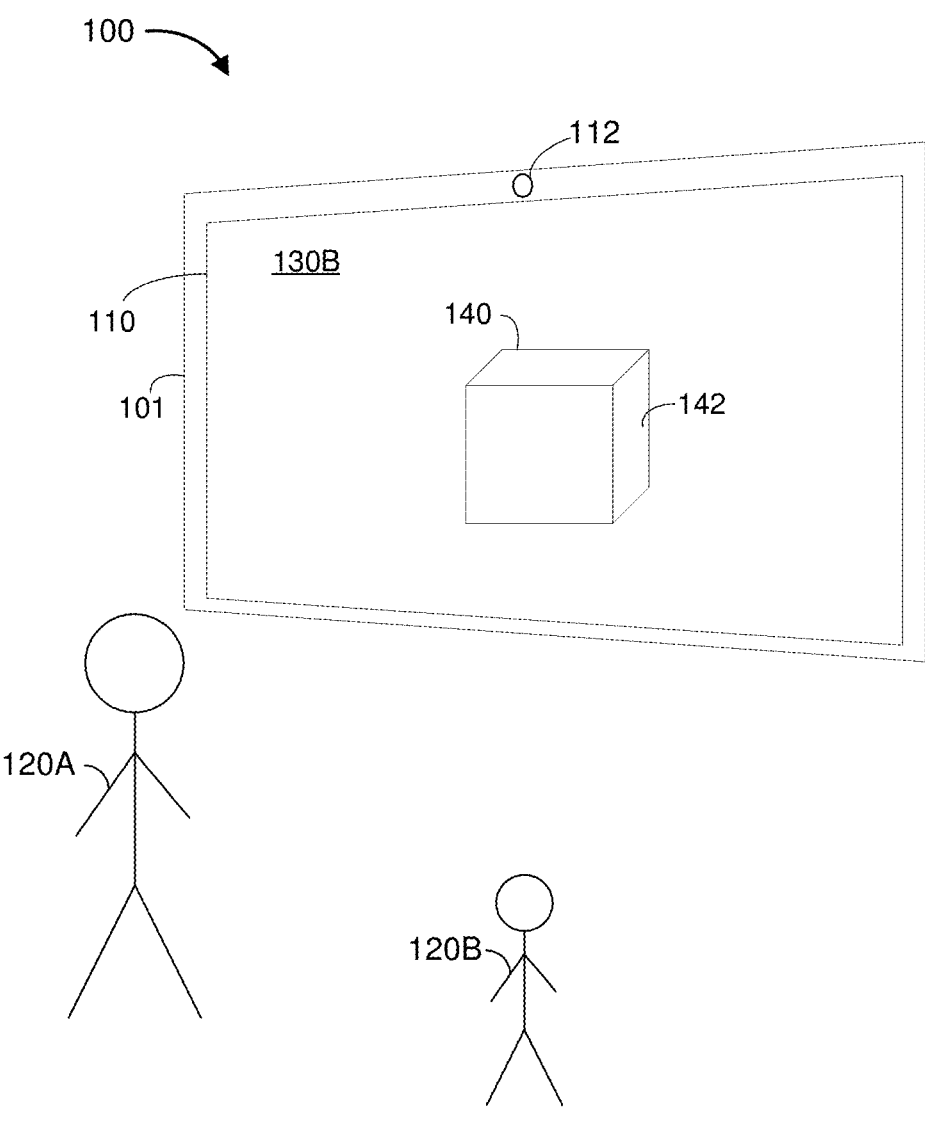
FIG. 1B illustrates a second perspective view of the example operating environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for operating a lenticular display. In various implementations, a method is performed at a device including a processor, non-transitory memory, an image sensor, and a lenticular display. The method includes capturing, using the image sensor, an image of a physical environment. The method includes, in response to detecting, in the image of the physical environment, one or more people at one or more horizontal angles with respect to the lenticular display, selectively activating a portion of the lenticular display to display content at the one or more horizontal angles.

Various implementations disclosed herein include devices, systems, and methods for operating a wearable device. In various implementations, a method is performed at a device in a physical environment, the device including a processor, non-transitory memory, and a display. The method includes determining a device operating condition based on whether the device is being worn by a user. The method includes, in response to determining that the device operating condition is a first operating condition corresponding to the device being worn by the user, selectively activating a portion of the display based on a location of a person in the physical environment to display content to the person. The method includes, in response to determining that the device operating condition is a second operating condition corresponding to the device being unworn by the user, activating at least a portion of the display based on a content type of content to display the content.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

Lenticular displays are capable of displaying different content at different angles. For example, when viewing a lenticular display from a first horizontal angle, an image from a first perspective is seen and when viewing the lenticular display from a second horizontal angle, the image from a second perspective, different than the first perspective, is seen.

In various implementations, a lenticular display includes a matrix of pixels over which a lenticular lens pattern is laid. In various implementations, a first set of the matrix of pixels is visible from a first horizontal angle, a second set of the matrix of pixels is visible from a second horizontal angle, a third set of the matrix of pixels is visible from a third horizontal angle, and so on. In various implementations, each set of the matrix of pixels includes a subset of the columns of the matrix. For example, in various implementations, the first set includes columns 1, 1+N, 1+2N, 1+3N, etc., the second set includes columns 2, 2+N, 2+2N, 2+3N, etc., the third set includes columns 3, 3+N, 3+2N, 3+3N, etc., where N is the number of sets and the number of horizontal angles at which the lenticular display can display different content.

In various implementations described below, this feature of lenticular displays is used to present different views at different horizontal angles with respect to the lenticular display. For example, in various implementations, different content is presented to different people at different horizontal angles. As another example, in various implementations, the same or different content is presented at horizontal angles at which a person is present and no content is presented at other horizontal angles. Accordingly, content at the other horizontal angles is neither rendered (saving power at a rendering processor) nor displayed (saving power at the lenticular display).

FIG. 1A illustrates a first perspective view of an example operating environment 100. The example operating environment 100 includes a device 101 having an image sensor 112 and a lenticular display 110. The example operating environment 100 includes a first person 120A and a second person 120B viewing the lenticular display. The first user 120A is at a first horizontal angle with respect to the lenticular display and the second user 120B is at a second horizontal angle with respect to the lenticular display. In various implementations, the first person 120A is a first height (e.g., an adult) and the second person 120B is a second height (e.g., a child).

In various implementations, the device 101 is mounted to a wall with the lenticular display 110 facing outwards from the wall to be viewable by the first person 120A and the second person 120B. In various implementations, the device 101 is worn by a user with the lenticular display 110 facing outwards from the user to be viewable by the first person 120A and the second person 120B. For example, in various implementations, the device 101 is a digital sandwich board which may, for example, display advertisements to consumers. As another example, in various implementations, the device 101 is a medical bracelet (or smartwatch) which may, for example, display medical information of the user to doctors, nurses, or emergency personnel. As another example, in various implementations, the device 101 is a hat which may, for example, display the logo of a sports team. Accordingly, in various implementations, the device is worn on a torso, wrist, head, or any other part of the user.

The first perspective view is illustrated from a position behind the first person 120A looking towards the device 101. From this first angle, first content 130A can be seen on the lenticular display 110. The first content 130A includes a cube 140 viewed from a particular horizontal angle. At the particular horizontal angle, a first side 141 of the cylinder 140 can be seen.

FIG. 1B illustrates a second perspective view of the example operating environment 100. The second perspective view is illustrated from a position behind the second person 120B looking towards the device 101. From this second angle, second content 130B can be seen on the lenticular display 110. The second content 130B includes the same cube 140 viewed from a different horizontal angle. At the different horizontal angle, the first side 141 of the cube 140 cannot be seen. However, at the different horizontal angle, a second side 142 of the cube 140 can be seen.

Thus, as described above, in various implementations, the first content 130A and the second content 130B are, respectively, based on the first horizontal angle of the first person 120A and the second horizontal angle of the second person 120B. In various implementations, the first content 130A and the second content 130B are additionally or alternatively based on other characteristics of the first person 120A and the second person 120B. For example, in various implementations, the first content 130A and the second content 130B are based on the heights of the first person 120A and the second person 120B, e.g., vertical angles of the first person 120A and the second person 120B with respect to the lenticular display. For example, in various implementations, the first content 130A includes the cube 140 viewed from the first horizontal angle of the first person 120A at a height of the first person 120A such that a top of the cube 140 can be seen and the second content 130B includes the cube 140 viewed from the second horizontal angle of the second person 120B at a height of the second person 120B such that a bottom of the cube can be seen. As another example, in various implementations, the first content 130A and the second content 130B are based on identities of the first person 120A and the second person 120B. For example, in various implementations, the first content 130A includes an uncensored version of content and the second content 130B includes censored version of the content.

Figure 1C:
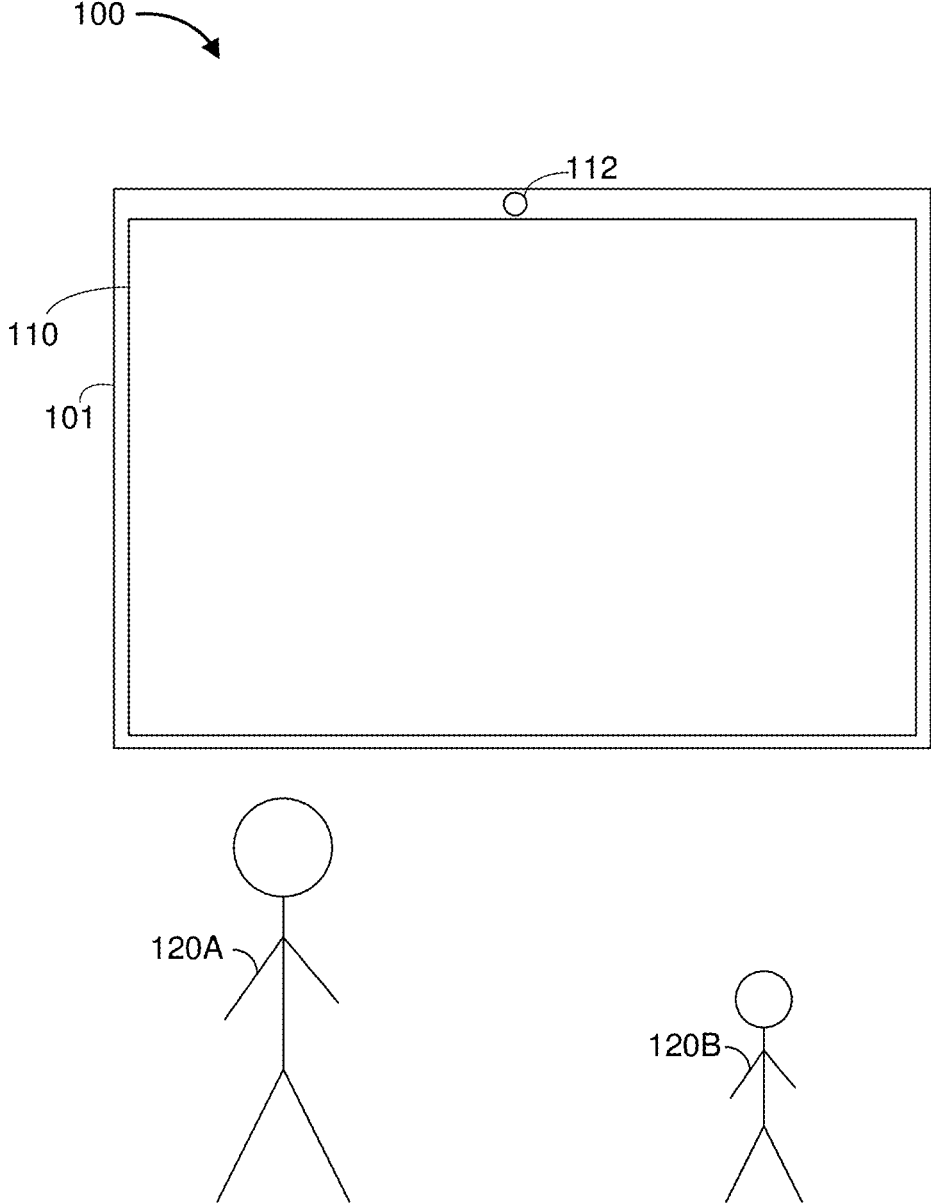
FIG. 1C illustrates a third perspective view of the example operating environment.

FIG. 1C illustrates a third perspective view of the example operating environment 100. The third perspective view is illustrated from a position behind a location between the first person 120A and the second person 120B looking towards the device 101. From this third horizontal angle, no content is seen on the lenticular display 110. Because a person is not detected at the third horizontal angle, the device 101 does not render the cube 140 nor activate the corresponding set of the matrix of pixels of the lenticular display 110 to display content.

Although FIGS. 1A-1C illustrates only two people in the example operating environment, in various implementations, any number of people may be present in the example operating environment 100 and have different content presented thereto. For example, in various implementations, the example operating environment 100 has zero, one, two, three, or more people.

In various implementations, the first content 130A and the second content 130B are the same content. In various implementations, the first content 130A and the second content 130B are different content. For example, in various implementations, the first content 130A and the second content 130B are two different images. In various implementations, the first content 130A and the second content 130B are two different videos. In various implementations, the first content 130A and the second content 130B are different versions of the same underlying content. For example, the second content 130B may be a censored version of the first content 130A.

In various implementations, the first content 130A and/or second content 130B is based on metadata regarding the user viewing the content. For example, if the first person 120A is associated with metadata indicating that the first person 120A has permission to view certain content, but that the second person 120B is not associated with metadata indicating that the second person 120B has permission to view the certain content, the first content 130A may include that certain content whereas the second content 130B may not include that certain content, but rather, other content. For example, the first person 120A may be associated with metadata indicating that the first person 120A has permission to watch television shows rated TV-MA or less, whereas the second person 120B is associated with metadata indicating that the second person 120B has permission to watch television shows rated TV-PG or less. Thus, the first content 130A may include a TV-MA rated television show and the second content may include a different show (rated TV-PG or less) or a censored version of the TV-MA rated television show.

In various implementations, as in FIGS. 1A and 1B, the first content 130A and the second content 130A are different perspective views of the same object or scene. In various implementations, the object is a virtual object. In various implementations, the object is a three-dimensional object. In various implementations, the scene is a virtual scene. In various implementations, the scene is a three-dimensional scene.

As described above, in various implementations, content is only rendered and displayed at the horizontal angle or horizontal angles at which a person is detected. In various implementations, no person is detected and no content is rendered or displayed at any horizontal angle. In such implementations, the entire display may be turned off for increased power savings.

In various implementations, even when a person is detected at a horizontal angle, content is not rendered or displayed at the horizontal angle. For example, if a person is detected at a horizontal angle, but it is further determined that the person is not looking at the display, content is not rendered or displayed at the horizontal angle. As another example, if a person is detected at a horizontal angle, but it is further determined that the person is within a threshold distance of the display such that the viewing experience would be negative (e.g., the distance would result in a poor rendering of the content or negative visual artifacts inherent to lenticular displays), content is not rendered or displayed at the horizontal angle.

Although significant power savings are realized by activating only a portion of the lenticular display, in various implementations, the entirety of the lenticular display may be activated to show the same content at each angle. In various implementations, the device 101 displays certain types of content without detecting one or more people at one or more horizontal angles.

Figure 2:
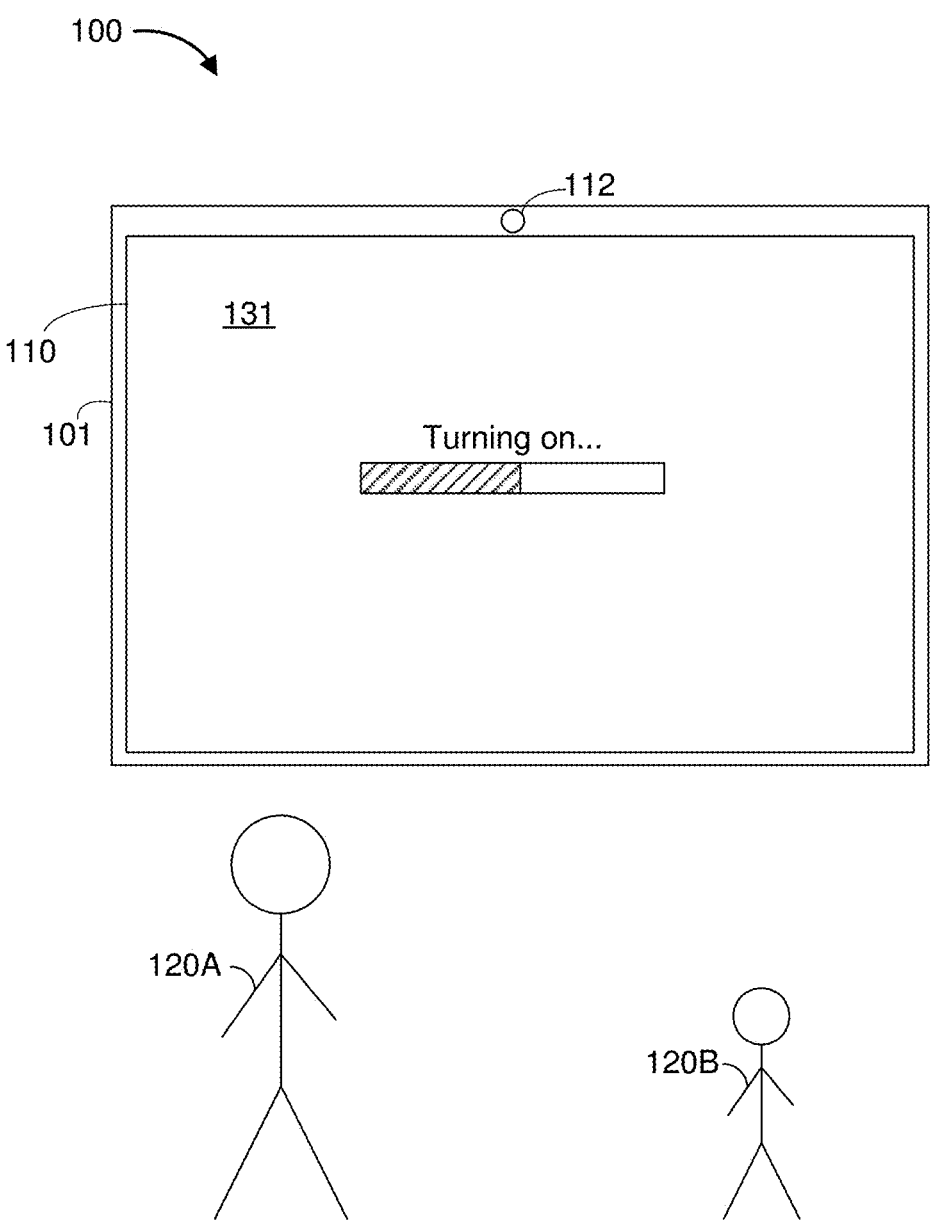
FIG. 2 illustrates the third perspective view of FIG. 1C during a booting procedure.

For example, during a booting of the device 101, the device 101 may not yet have initialized an image sensor or a person-detection module and, thus, cannot yet detect one or more people at one or more horizontal angles. However, the device 101 may still display booting content to indicate that booting is occurring to people who may be present. FIG. 2 illustrates the third perspective view of the example operating environment 100 during a booting of the device 101. From the third horizontal angle, booting content 131 is seen on the lenticular display 110 even though no person is detected at the third horizontal angle. Further, the same booting content is displayed at the first horizontal angle of the first user 120A and the second horizontal angle of the second user 120B regardless of the presence of the first user 120A and/or second user 120B.

Figure 3:
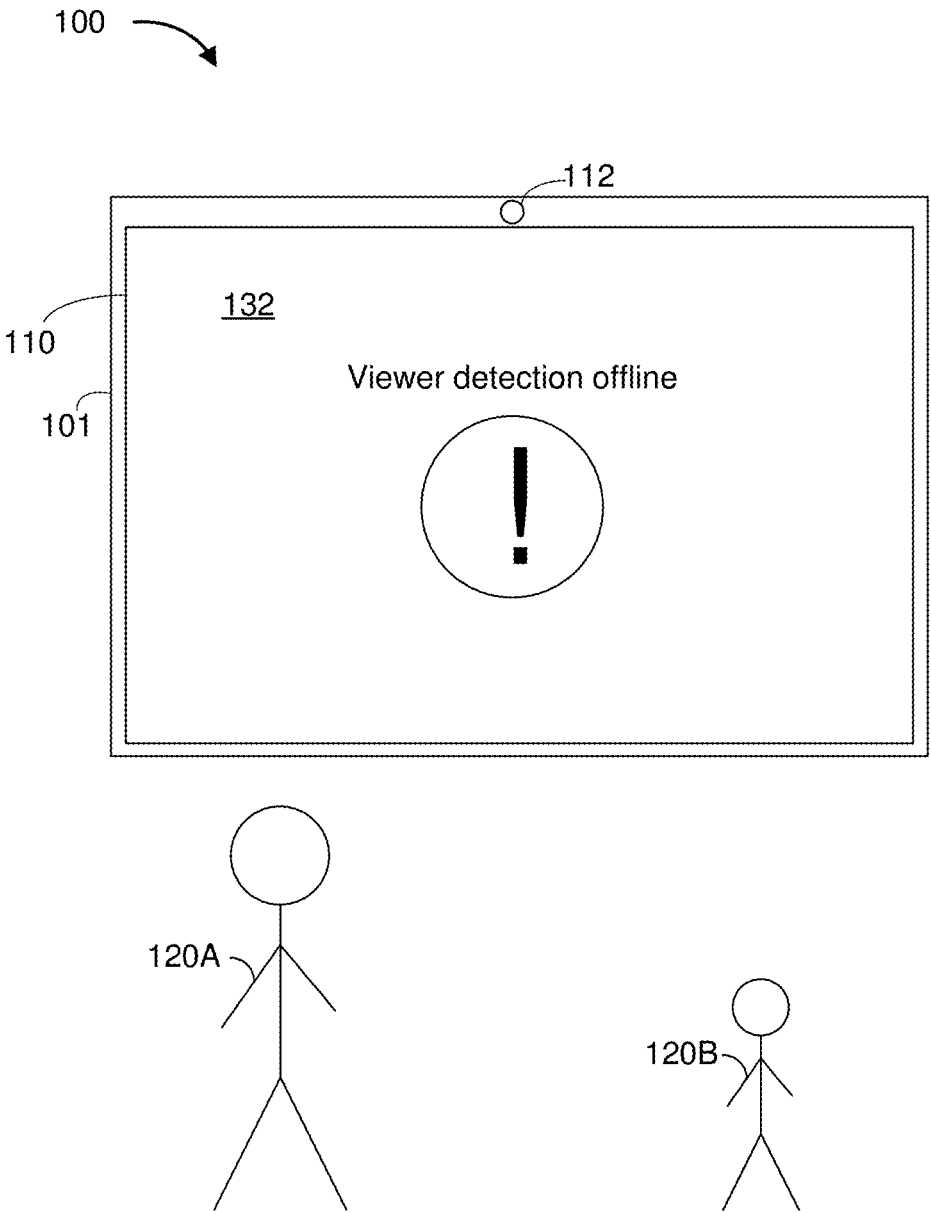
FIG. 3 illustrates the third perspective view of FIG. 1C in response to detecting an error condition.

As another example, an image sensor of the device 101 may be occluded and the device 101 may be unable to detect one or more people at one or more horizontal angles. However, the device 101 may still display notification content to indicate the inability to people who may be present. FIG. 3 illustrates the third perspective view of the example operating environment 100 in response to receiving a notification at the device 101. From the third horizontal angle, error content 132 is seen on the lenticular display 110 even though no person is detected at the third horizontal angle. Further, the same error content is displayed at the first horizontal angle of the first user 120A and the second horizontal angle of the second user 120B, regardless of the presence of the first user 120A and/or second user 120B.

Figure 4:
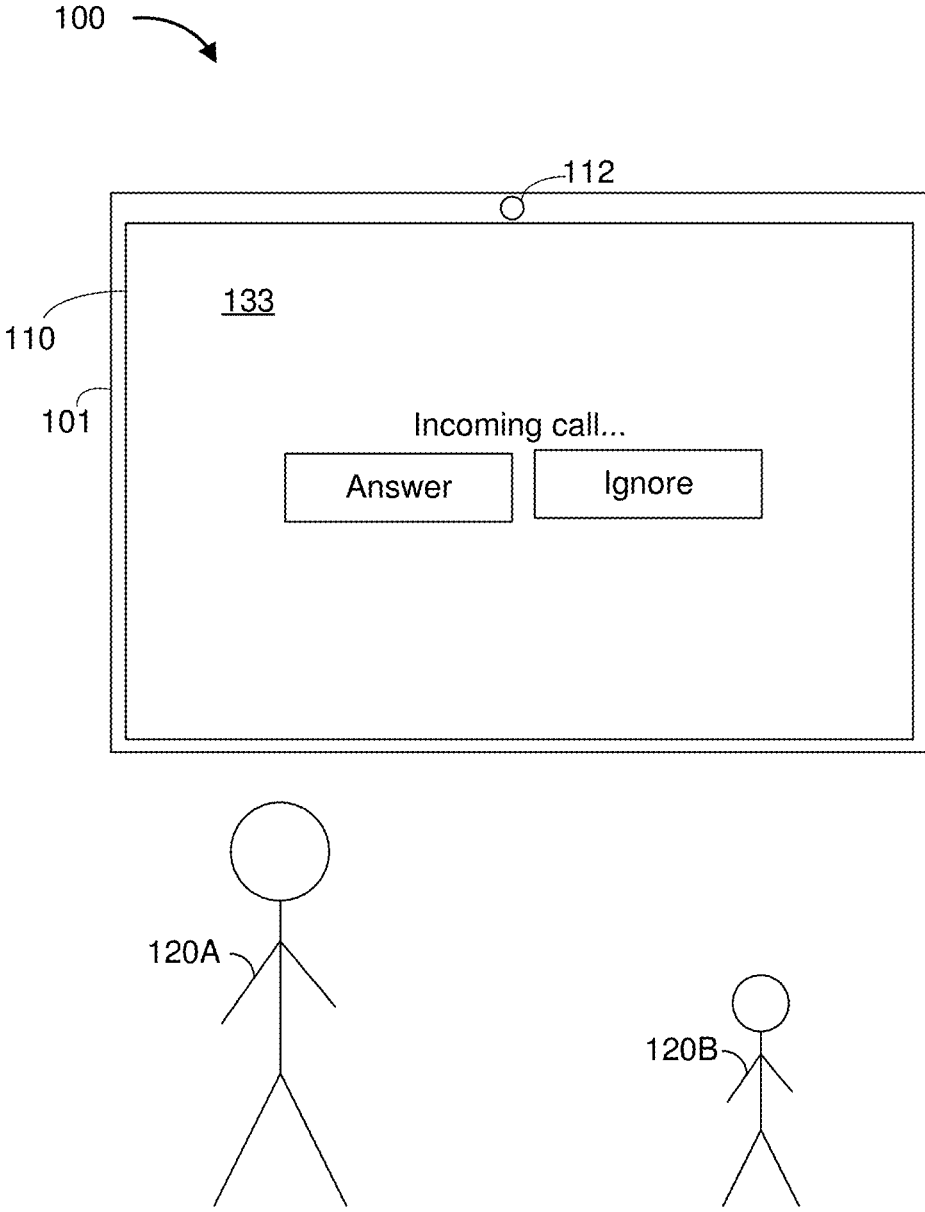
FIG. 4 illustrates the third perspective view of FIG. 1C in response to receiving a notification.

As another example, certain types of content may include information deemed to have such importance that the content is displayed whether a person is detected or not. For example, the booting content may include information so deemed. As another example, error content (relating to person detection or other errors) may include information so deemed. As another example, notification content indicating receipt of a notification may include information so deemed. FIG. 4 illustrates the third perspective view of the example operating environment 100 in response to receiving a notification at the device 101. From the third horizontal angle, notification content 133 is seen on the lenticular display 110 even though no person is detected at the third horizontal angle. Further, the same notification content is displayed at the first horizontal angle of the first user 120A and the second horizontal angle of the second user 120B, regardless of the presence of the first user 120A and/or second user 120B. In various implementations, the notification includes a notification of an incoming call or message.

FIG. 5 is a flowchart representation of a method 500 of operating a lenticular display in accordance with some implementations. In various implementations, the method 500 is performed by a device with one or more processors, non-transitory memory, an image sensor, and a lenticular display (e.g., the device 101 of FIGS. 1A-1C). In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

The method 500 begins, in block 510, with the device capturing, using the image sensor, an image of a physical environment.

The method 500 continues, in block 520, with the device, in response to detecting, in the image of the physical environment, one or more people at one or more horizontal angles with respect to the lenticular display, selectively activating a portion of the lenticular display to display content at the one or more horizontal angles. In various implementations, the content displayed at multiple horizontal angles is the same content. In various implementations, the content displayed a multiple horizontal angles is different content. In various implementations, selectively activating the portion of the lenticular display includes selectively activating one or more sets of columns of pixels of the lenticular display. For example, in various implementations, each set of columns of pixels correspond to a respective horizontal angle. In various implementations, each set of columns of pixels includes a plurality of evenly spaced columns.

In various implementations, the method 500 includes detecting, in the image of the physical environment, the one or more people at the one or more horizontal angles with respect to the lenticular display. In various implementations, various person-detection algorithms (such as a facial object recognition algorithm) can be used to detect the one or more people and determine the one or more horizontal angles. In various implementations, in addition to detecting humans as viewers, the device detects non-human animals as viewers, such as a dog or cat, and displays content at horizontal angles at which a non-human viewer is detected. In various implementations, detecting the one or more people includes detecting a single person. In various implementations, detecting the one or more people includes detecting a plurality of people.

In various implementations, selectively activating the portion of the display includes forgoing activation of (or deactivating) the remainder of the lenticular display. In various implementations, pixels in the remainder of the lenticular display are off or black. Thus, the lenticular display consumes less power than would be consumed if the entirety of the lenticular display were active. In various implementations, the method 500 further includes selectively rendering the content at the one or more horizontal angles. Thus, additional power savings are realized by a rendering processor of the device by forgoing the rendering of content at angles which are not displayed and/or seen by a person. In various implementations, the method 500 further includes, in response to detecting, in the image of the physical environment, no people, deactivating an entirety of the lenticular display. Thus, even further power savings are realized by the lenticular display by deactivating not just particular pixels, but the entire lenticular display.

In various implementations, selectively activating the portion of the lenticular display to display the content at the one or more horizontal angles includes activating a first portion of the lenticular display to display first content at a first horizontal angle of a first person and activating a second portion of the lenticular display to display second content at a second horizontal angle of a second person. In various implementations, the first portion of the lenticular display includes a first set of columns of pixels of the lenticular display and the second portion of the lenticular display includes a second set of columns of pixels of the lenticular display.

In various implementations, the first content and the second content are the same content. In various implementations, the first content and the second content are different content. For example, in various implementations, the first content includes a first image and the second content includes a second image different than the first image. In various implementations, the first content includes a first video and the second content includes a second video different than the first video. In various implementations, the first content includes a first version of content and the second content includes a second version of the content different from the first version of the content. In various implementations, the second version of the content is a censored version of the first version of the content.

In various implementations, the first content includes an object or scene at a first perspective and the second content includes the object or scene at a second perspective different than the first perspective. In various implementations, the first perspective and second perspective are based on the first horizontal angle of the first person and the second horizontal angle of the second person. In various implementations, the first perspective and second perspective are based on a first vertical angle of the first person and a second vertical angle of the second person.

In various implementations, selectively activating the portion of the lenticular display to display the content at the one or more horizontal angles includes updating one or more respective sub-portions of the portion of lenticular display at respective refresh rates based on one or more distances of the one or more people from the lenticular display. Thus, in various implementations, the first content includes first content updated at a first refresh rate based on a first distance of the first person from the lenticular display and the second content includes second content updated at a second refresh rate based on a second distance of the second person from the lenticular display. For example, for a person that is further away from the lenticular display, the refresh rate may be less.

In various implementations, the method 500 further includes, during a booting of the device, activating an entirety of the lenticular display to display booting content. In various implementations, the booting content is displayed at each horizontal angle at which the lenticular display can display content. In various implementations, the method 500 further includes, in response to detecting an error condition of the device, activating an entirety of the lenticular display to display error content. In various implementations, the error content is displayed at each horizontal angle at which the lenticular display can display content. In various implementations, the method 500 further includes, in response to receiving a notification at the device, activating an entirety of the lenticular display to display notification content. In various implementations, the notification content is displayed at each horizontal angle at which the lenticular display can display content.

FIG. 6 is a flowchart representation of a method 600 of operating a wearable display in accordance with some implementations. In various implementations, the method 600 is performed by a device in a physical environment, the device including one or more processors, non-transitory memory, and a display (e.g., the device 101 of FIGS. 1A-IC). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device determining a device operating condition based on whether the device being worn by a user. In various implementations, determining the device operating condition is based on sensor information indicative of a presence or proximity of the user. In various implementations, the device is wearable such that the display faces outward from the user. For example, in various implementations, the device is a digital sandwich board having a display on a chest and/or back of a user. As another example, in various implementations, the device is a medical bracelet or smartwatch. As another example, in various implementations, the device is a hat or head-mounted display. Accordingly, in various implementations, the device is worn on a torso, wrist, head, or any other part of the user.

The method 600 continues, in block 620, with the device, in response to determining that the device operating condition is a first operating condition corresponding to the device being worn by the user, selectively activating a portion of the display based on a location of a person in the physical environment to display content to the person. In various implementations, the display is a lenticular display. Thus, in various implementations, selectively activating the portion of the display includes selectively activating a set of columns of pixels of the display. In various implementations, selectively activating the portion of the display includes forgoing activating of a remainder of the display. In various implementations, selectively activating the portion of the display includes capturing, using an image sensor, an image of the physical environment and detecting, in the image of the physical environment, the person at the location in the physical environment.

In various implementations, selectively activating the portion of the display includes activating a first portion of the display based on a location of a first person in the physical environment to display first content to the first person and activating a second portion of the display based on a location of a second person in the physical environment to display second content to the second person. In various implementations, the first content and the second content are the same content. In various implementations, the first content and the second content are different content. For example, in various implementations, the first content includes an object or scene at a first perspective of the first person and the second content includes the object or scene at a second perspective of the second person different than the first perspective of the first person.

The method 600 continues, in block 630, with the device, in response to determining that the device operating condition is a second operating condition corresponding to the device being unworn by the user, activating at least a portion of the display based on a content type of content to display the content. In various implementations, activating at least a portion of the display includes activating an entirety of the display. In various implementations, activating at least the portion of the display based on the content type of the content includes activating at least the portion of the display based on the content being booting content displayed during a booting of the device. In various implementations, activating at least the portion of the display based on the content type of the content includes activating at least the portion of the display based on the content being error content displayed in response to detecting an error condition of the device. In various implementations, activating at least the portion of the display based on the content type of the content includes activating at least the portion of the display based on the content being notification content displayed in response to receiving a notification.

Figure 7:
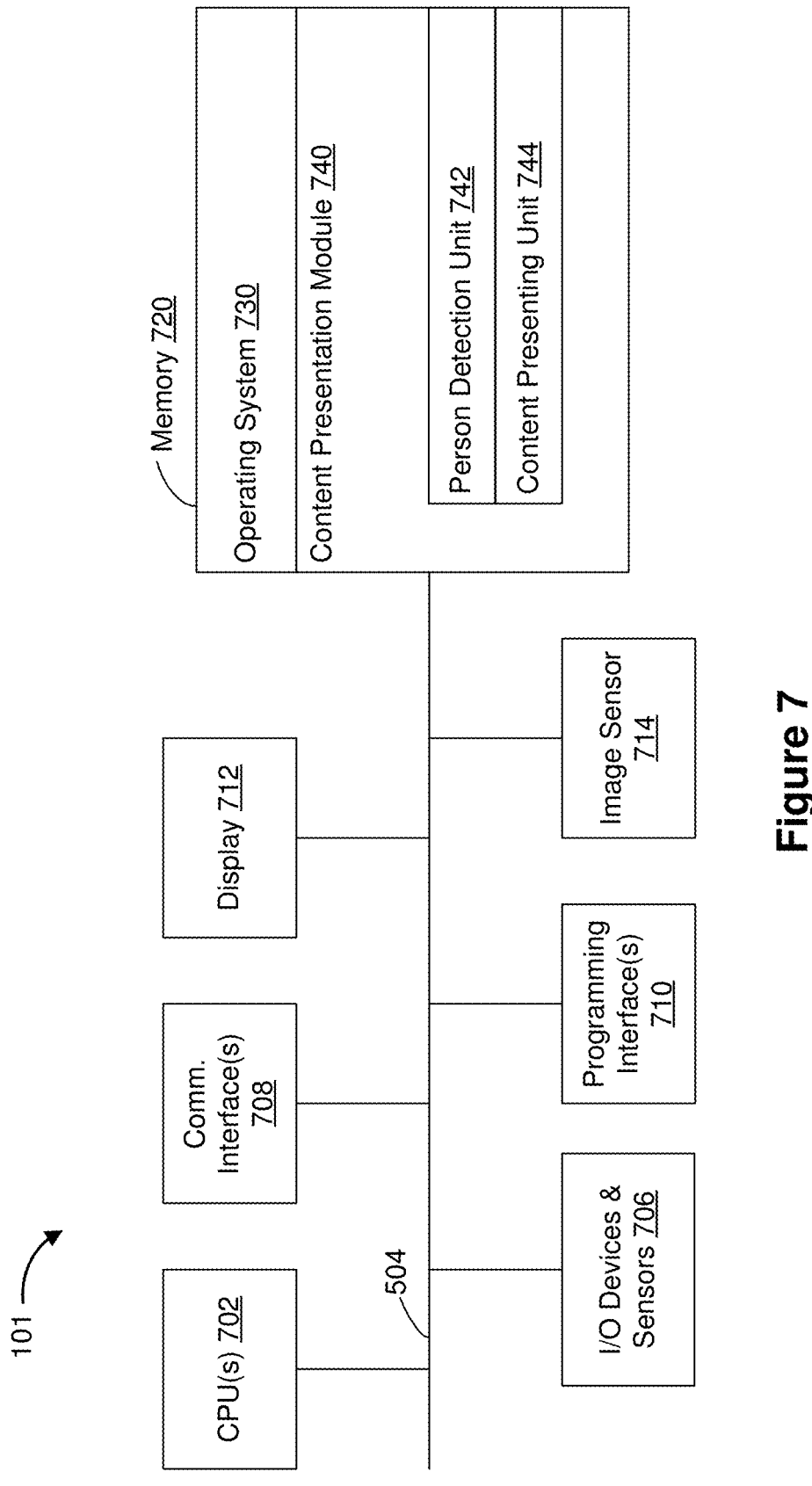
FIG. 7 is a block diagram of an example of the device of FIGS. 1A-1C in accordance with some implementations.

FIG. 7 is a block diagram of an example of the device 101 of FIGS. 1A-1C in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 101 includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 710, a display 712, an image sensor 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a gyroscope, a thermometer, one or more microphones, one or more speakers, one or more biometric sensors (e.g., blood pressure monitor, heart rate monitor, breathing monitor, electrodermal monitor, blood oxygen sensor, blood glucose sensor, etc.), a haptics engine, one or more depth sensors (e.g., a structured light, a time-of-flight, or the like), and/or the like.

In some implementations, the display 712 is configured to display different content at different angles. In some implementations, the display 712 includes holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the display 712 corresponds to diffractive, reflective, polarized, holographic, etc. waveguide displays. In various implementations, the display 712 is capable of presenting mixed reality and/or virtual reality content.

In various implementations, the image sensor 714 includes one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some implementations, the memory 720 or the non-transitory computer readable storage medium of the memory 720 stores the following programs, modules and data structures, or a subset thereof including an optional operating system 730 and a content presentation module 740.

The operating system 730 includes procedures for handling various basic system services and for performing hardware dependent tasks. In some implementations, the content presentation module 740 is configured to present different content to different users at different angles via the lenticular display 740. To that end, in various implementations, the content presentation module 740 includes a person detection unit 742 and a content presenting unit 744.

In some implementations, the person detection unit 742 is configured to detect one or more users at one or more horizontal angles with respect to a line perpendicular to the display 712. To that end, in various implementations, the person detection unit 742 includes instructions and/or logic therefor, and heuristics and metadata therefor.

In some implementations, the content presenting unit 744 is configured to selectively activate a portion of the lenticular display to display content at the one or more horizontal angles. To that end, in various implementations, the content presenting unit 744 includes instructions and/or logic therefor, and heuristics and metadata therefor.

Although the person detection unit 742 and the content presenting unit 744 are shown as residing on a single device (e.g., the device 101 of FIGS. 1A-1C), it should be understood that in other implementations, the person detection unit 742 and the content presenting unit 744 may be located in separate computing devices.

Moreover, FIG. 7 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device in a physical environment, the device including one or more processors, non-transitory memory, and a display:
determining a device operating condition based on whether the device is being worn by a user;
in response to determining that the device operating condition is a first operating condition corresponding to the device being worn by the user, selectively activating a portion of the display based on a location of a person in the physical environment to display content to the person; and
in response to determining that the device operating condition is a second operating condition corresponding to the device being unworn by the user, activating at least a portion of the display based on a content type of content to display the content.

2. The method of claim 1, wherein determining the device operating condition is based on sensor information indicative of a presence or proximity of the user.

3. The method of claim 1, wherein the display is a lenticular display.

4. The method of claim 1, wherein selectively activating the portion of the display includes selectively activating a set of columns of pixels of the display.

5. The method of claim 1, wherein selectively activating the portion of the display includes forgoing activation of a remainder of the display.

6. The method of claim 1, wherein selectively activating the portion of the display includes:
capturing, using an image sensor, an image of the physical environment; and
detecting, in the image of the physical environment, the person at the location in the physical environment.

7. The method of claim 1, wherein selectively activating a portion of the display includes activating a first portion of the display based on a location of a first person in the physical environment to display first content to the first person and activating a second portion of the display based on a location of a second person in the physical environment to display second content to the second person.

8. The method of claim 7, wherein the first content and the second content are the same content.

9. The method of claim 7, wherein the first content and the second content are different content.

10. The method of claim 9, wherein the first content includes an object or scene at a first perspective of the first person and the second content includes the object or scene at a second perspective of the second person different than the first perspective of the first person.

11. The method of claim 1, wherein activating at least the portion of the display includes activating an entirety of the display.

12. The method of claim 1, wherein activating at least the portion of the display based on the content type of the content includes activating at least the portion of the display based on the content being booting content displayed during a booting of the device.

13. The method of claim 1, wherein activating at least the portion of the display based on the content type of the content includes activating at least the portion of the display based on the content being error content displayed in response to detecting an error condition of the device.

14. The method of claim 1, wherein activating at least the portion of the display based on the content type of the content includes activating at least the portion of the display based on the content being notification content displayed in response to receiving a notification.

15. A device comprising:
a display; and
a non-transitory memory; and
one or more processors to:
    determine a device operating condition based on whether the device is being worn by a user;
    in response to the one or more processors determining that the device operating condition is a first operating condition corresponding to the device being worn by the user, selectively activate a portion of the display based on a location of a person in the physical environment to display content to the person; and
    in response to the one or more processors determining that the device operating condition is a second operating condition corresponding to the device being unworn by the user, activate at least a portion of the display based on a content type of content to display the content.

16. The device of claim 15, wherein the one or more processors are to determine the device operating condition based on sensor information indicative of a presence or proximity of the user.

17. The device of claim 15, wherein the display is a lenticular display.

18. The device of claim 15, wherein the one or more processors are to selectively activate the portion of the display by forgoing activation of a remainder of the display.

19. The device of claim 15, wherein the one or more processors are to activate at least the portion of the display by activating an entirety of the display.

20. A non-transitory memory storing one or more programs, which, when executed by one or more processors of a device with a display cause the device to:
    determine a device operating condition based on whether the device is being worn by a user;
    in response to determining that the device operating condition is a first operating condition corresponding to the device being worn by the user, selectively activate a portion of the display based on a location of a person in the physical environment to display content to the person; and
    in response to determining that the device operating condition is a second operating condition corresponding to the device being unworn by the user, activate at least a portion of the display based on a content type of content to display the content.

* * * * *